(12) United States Patent
Chou et al.

(10) Patent No.: US 11,709,737 B2
(45) Date of Patent: *Jul. 25, 2023

(54) RESTORING VIRTUAL NETWORK FUNCTION (VNF) PERFORMANCE VIA VNF RESET OF LIFECYCLE MANAGEMENT

(71) Applicant: Apple Inc., Cupertino, CA (US)

(72) Inventors: Joey Chou, Scottsdale, AZ (US);
Stephen Gooch, Santa Clara, CA (US);
Meghashree Dattatri Kedalagudde, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,037

(22) Filed: May 16, 2022

(65) Prior Publication Data

US 2022/0276933 A1    Sep. 1, 2022

Related U.S. Application Data

(63) Continuation of application No. 17/156,966, filed on Jan. 25, 2021, now Pat. No. 11,340,994, which is a
(Continued)

(51) Int. Cl.
*G06F 11/00* (2006.01)
*G06F 11/14* (2006.01)
(Continued)

(52) U.S. Cl.
CPC ...... *G06F 11/1438* (2013.01); *G06F 11/0712* (2013.01); *G06F 11/3409* (2013.01);
(Continued)

(58) Field of Classification Search
CPC ............ G06F 11/0712; G06F 11/1438; G06F 11/1441; G06F 11/301; G06F 11/3409;
(Continued)

(56) References Cited

U.S. PATENT DOCUMENTS 9,667,509 B1   5/2017   Levi
9,846,601 B2   12/2017  Li
(Continued)

FOREIGN PATENT DOCUMENTS

WO   2015/042937 A1   4/2015
WO   2015/126430 A1   8/2015
(Continued)

OTHER PUBLICATIONS

International Search Report dated Sep. 22, 2016 for International Application PCT/US2016/033002.
(Continued)

*Primary Examiner* — Elmira Mehrmanesh
(74) *Attorney, Agent, or Firm* — Eschweiler & Potashnik, LLC

(57) ABSTRACT

Techniques for identifying and remedying performance issues of Virtualized Network Functions (VNFs) are discussed. An example method includes outputting a request to a network Element Manager (EM) to create a Virtualized Network Function (VNF) Performance Measurement (PM) job to collect VNF PM data from a VNF and receiving a set of VNF PM data associated with the VNF from the EM. The set of VNF PM data is processed associated with the VNF. A request to the EM is output to create a Virtualization Resource (VR) PM job to collect, through a VNF Manager (VNFM) and a virtualized infrastructure manager (VIM), VR PM data from a VR used by the VNF. Then a set of VR PM data is received from the EM and processed.

20 Claims, 7 Drawing Sheets

Related U.S. Application Data continuation of application No. 15/767,203, filed as application No. PCT/US2016/033002 on May 18, 2016, now Pat. No. 10,901,852.

(60) Provisional application No. 62/249,769, filed on Nov. 2, 2015.

(51) Int. Cl.
| | | |
|---|---|---|
| *G06F 11/34* | (2006.01) | |
| *G06F 11/07* | (2006.01) | |
| *H04L 43/08* | (2022.01) | |
| *H04L 43/00* | (2022.01) | |
| *H04L 41/0654* | (2022.01) | |
| *H04L 43/0817* | (2022.01) | |

(52) U.S. Cl.
CPC ...... *G06F 11/3495* (2013.01); *H04L 41/0654* (2013.01); *H04L 43/00* (2013.01); *H04L 43/08* (2013.01); *H04L 43/0817* (2013.01); *G06F 2201/875* (2013.01)

(58) Field of Classification Search
CPC ............. G06F 11/3428; G06F 11/3495; H04L 41/0654; H04L 43/08; H04L 43/0817
See application file for complete search history.

(56) References Cited

U.S. PATENT DOCUMENTS

| | | | |
|---|---|---|---|
| 9,912,558 B2 | 3/2018 | Chou | |
| 10,042,662 B1 | 8/2018 | Marquardt | |
| 10,116,514 B1 | 10/2018 | Felstaine | |
| 10,901,852 B2 * | 1/2021 | Chou | G06F 11/0712 |
| 11,340,994 B2 * | 5/2022 | Chou | H04L 43/20 |
| 2005/0243062 A1 | 11/2005 | Liberty | |
| 2006/0284857 A1 | 12/2006 | Guen | |
| 2010/0295773 A1 | 11/2010 | Alameh | |
| 2011/0080349 A1 | 4/2011 | Holbrien | |
| 2011/0254760 A1 | 10/2011 | Lloyd | |
| 2012/0307697 A1 | 12/2012 | Mukhopadhyay | |
| 2013/0154998 A1 | 6/2013 | Yang | |
| 2013/0303114 A1 | 11/2013 | Ahmad | |
| 2014/0201374 A1 | 7/2014 | Ashwood-Smith et al. | |
| 2014/0317261 A1 | 10/2014 | Shatzkamer | |
| 2014/0325649 A1 | 10/2014 | Zhang | |
| 2015/0082308 A1 | 3/2015 | Kiess | |
| 2016/0170848 A1 | 6/2016 | Yang | |
| 2016/0205004 A1 | 7/2016 | Chou | |
| 2016/0323200 A1 | 11/2016 | Xiang | |
| 2017/0012898 A1 | 1/2017 | Zhu | |

FOREIGN PATENT DOCUMENTS

| | | |
|---|---|---|
| WO | 2015/135611 A1 | 9/2015 |
| WO | 2015/154478 A1 | 10/2015 |
| WO | 2015143610 A1 | 10/2015 |

OTHER PUBLICATIONS

"Digital cellular telecommunications system (Phase 2+) (GSM); Universal Mobile Telecommunications System (UMTS); LTE; Telecommunication management; Performance Management (PM); Concept and requirements (3GPP TS 32.401 version 13.0.0 Release 13)." ETSI TS 132 401 V13.0.0 (Mar. 2016). 3GPP LTE Advanced Pro. 32 pages.

"Network Functions Virtualisation (NFV); Management and OrchesliaLion; Vi-Vnfm reference point—Interface and Information Model Specification." ETSI GS NFV-IFA 006 V2.1.1 (Apr. 2016). 109 pages.

3rd Generation Partnership Project; Technical Specification Group Services and System Aspects; Telecommunication Management; Performance Management (PM) for mobile networks that include virtualized network functions Requirements (Release 14). 3GPP TS 28.520 V0.3.0 (Feb. 2016). 3GPP Lte Advanced Pro. 13 pages.

Non-Final Office Action dated Dec. 13, 2019 in connection with U.S. Appl. No. 15/767,203.

Notice of Allowance dated Sep. 15, 2020 in connection with U.S. Appl. No. 15/767,203.

Non-Final Office Action dated Nov. 24, 2021 in connection with U.S. Appl. No. 17/156,966.

Notice of Allowance dated Jan. 31, 2022 in connection with U.S. Appl. No. 17/156,966.

\* cited by examiner

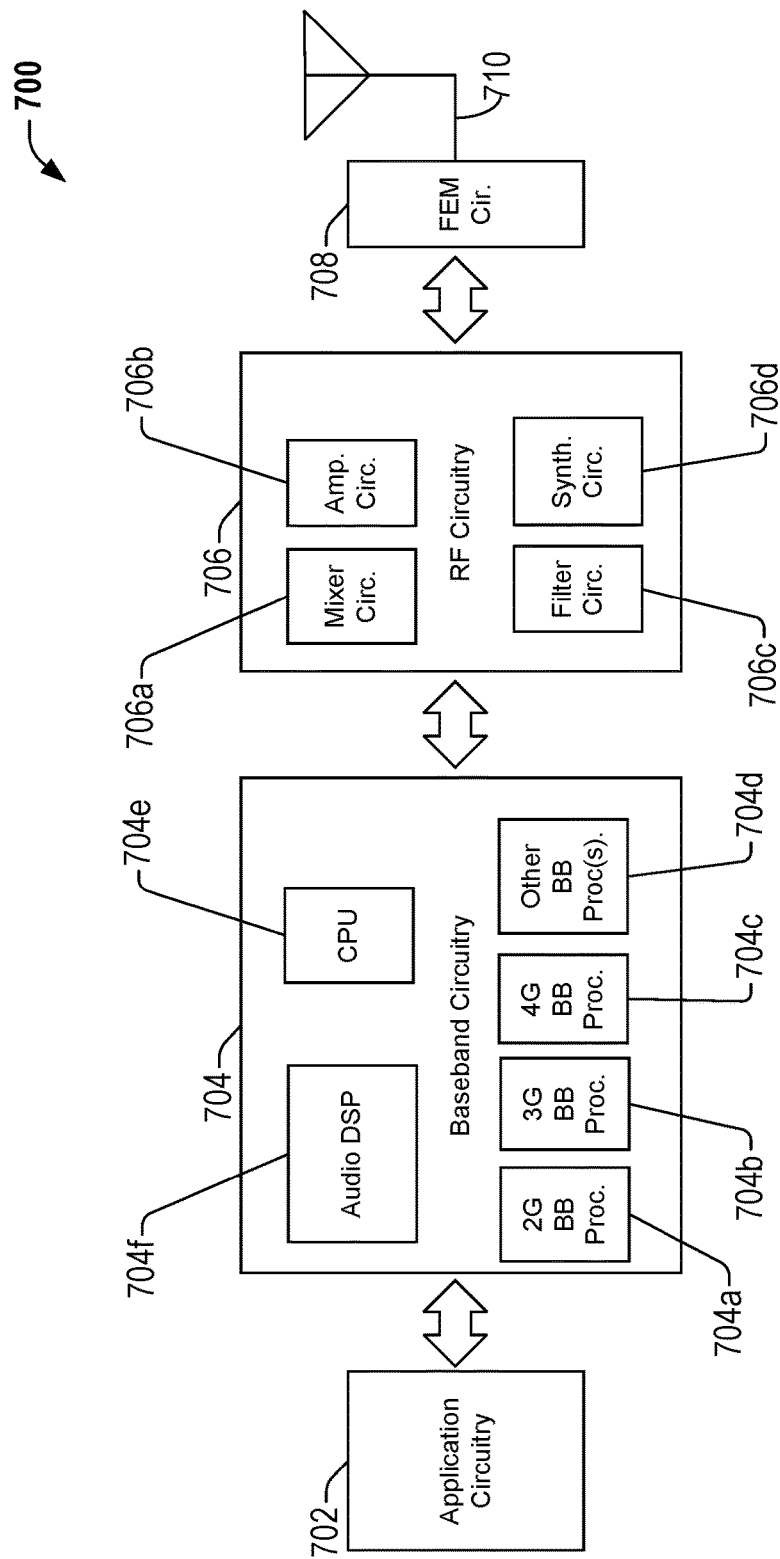

RESTORING VIRTUAL NETWORK FUNCTION (VNF) PERFORMANCE VIA VNF RESET OF LIFECYCLE MANAGEMENT

REFERENCE TO RELATED APPLICATIONS

This application is a Continuation of U.S. application Ser. No. 17/156,966 filed on Jan. 25, 2021, granted as U.S. Pat. No. 11,340,994, which is a Continuation of U.S. application Ser. No. 15/767,203 filed on Apr. 10, 2018, granted as U.S. Pat. No. 10,901,852, which is a National Phase entry application of International Patent Application No. PCT/US2016/033002 filed May 18, 2016, which claims priority to U.S. Provisional Application 62/249,769 filed on Nov. 2, 2015, entitled "RESTORING VNF PERFORMANCE VIA VNF RESET OF LIFECYCLE MANAGEMENT" in the name of Joey Chou et al. and is hereby incorporated by reference in its entirety.

FIELD

The present disclosure relates to wireless technology, and more specifically to restoring performance of virtual network functions (VNFs) of a wireless network.

BACKGROUND

Network Function Virtualization (NFV) involves the replacement of physical network nodes with Virtual Network Functions (VNFs) implemented via Virtualization Resources (VRs) that perform the same function as the physical node.

BRIEF DESCRIPTION OF THE DRAWINGS

FIG. 7 is a block diagram illustrating an example user equipment (UE) useable in connection with various aspects described herein.

DETAILED DESCRIPTION

Figure 1:
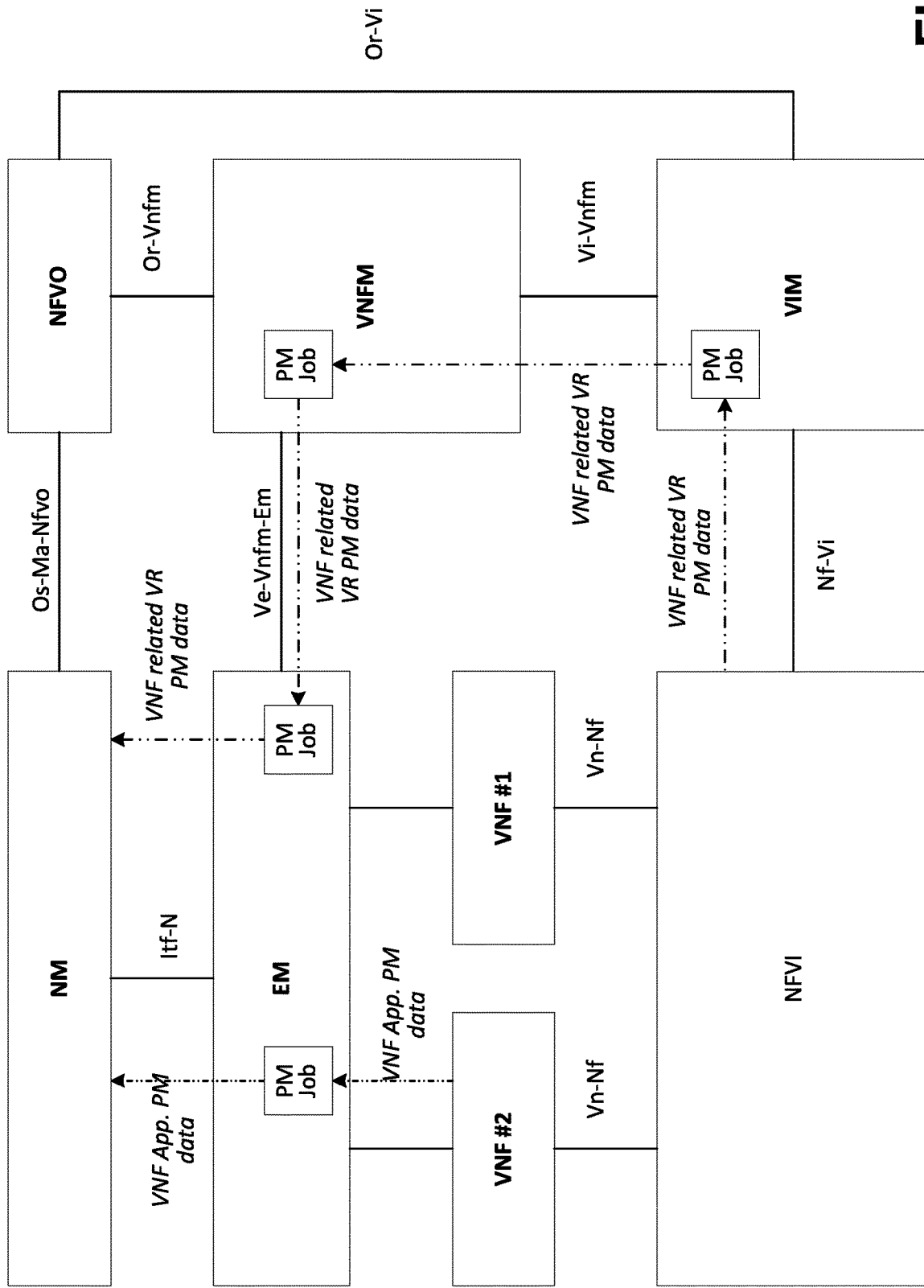
FIG. 1 is a diagram illustrating a Performance Measurement (PM) data collection flow that can be employed in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Various embodiments described herein can facilitate improved performance of Virtualized Network Functions (VNFs) via identification of underperforming VNFs and restoration of VNF performance.

The performance of an application software is tightly coupled to the hardware resource on which the application software is running. For example, this can be when a web application is running so slowly that it may take minutes to display the web page that contains multimedia content, such as pictures, video, audio, text, etc. When this happens, a common response is to launch a task manager to see how the computer hardware is performing. The task manager can display the statistics of CPU, memory, disc, and network (i.e. WiFi, or Ethernet) usages.

The following are a few example scenarios that can be found from the task manager: (1) CPU 100%, memory 100%, network 70%, which may indicate that the computer is using all its resources to process the multimedia content; (2) CPU 10%, memory 40%, network 10%, which may indicate that the application server is too busy to provide the content on time; or (3) CPU 5%, memory 85%, network 30%, which may indicate that the application is pending on the availability of certain resources (e.g., memory) that have been exhausted due to unknown reasons.

These different scenarios can result from different circumstances, each of which can be analogous to scenarios that can occur in connection with Network Function Virtualization (NFV). Scenario 1 can indicate that the computer hardware is too old to handle the multimedia content, and probably should be replaced. In NFV, a similar scenario can indicate that the resource is deficient in handling the traffic, and can be solved by auto-scaling. Scenario 2 can indicate a server problem that is out of the control of any application. Scenario 3 can point to problems in the application or operating system that can be triggered by many different reasons. One common way to fix this problem is to simply press the reset button, as it is not worth spending effort to find out its root cause. A similar scenario can happen in NFV. Analogously, one possible way to solve this problem is to restart the VNF via VNF termination and re-instantiation, or via reset.

In various embodiments, techniques described herein can be employed to correlate both VNF performance measurements and Virtualization Resource (VR) measurements to discover a VNF that is not performing, and find a solution to mitigate the VNF.

Referring to FIG. 1, illustrated is a diagram of a Performance Measurement (PM) data collection flow that can be employed in connection with various aspects described herein. The system illustrated in FIG. 1 comprises a Network Manager (NM), Network Function Virtualization (NFV) Orchestrator (NFVO), network Element Manager (EM), a set of Virtualized Network Functions (VNFs) virtualized by Virtualization Resources (VRs) of a NFV Infrastructure (NFVI), a VNF Manager (VNFM), and a Virtualized Infrastructure Manager (VIM). The solid lines between these entities indicate the various reference points that facilitate data exchange between these entities, while the dashed and dotted lines indicate the flow of PM data (either VNF PM data or VR PM data).

To collect the PM data, the NM can create a PM job at the EM that can determine which measurement types, on which measured resources, at which times, are to be executed, which can be based on techniques discussed in 3GPP (Third Generation Partnership Project) TS (Technical Specification) 32.401.

Two types of PM data can be collected: VNF PM data, and VR PM data for the VR(s) that implement that VNF.

For VNF PM data collection, the EM can request that VNF to collect the VNF PM data based on the schedule and time period provided by EM.

For VR PM data collection, the EM can create a VR PM job at the VNFM that contains the measurement types, and the periods for which the collection is to be performed. Then, the VNFM can create a VR PM job at the VIM that contains the same information as received from the EM. The VIM can request the NFVI to collect the VR PM data based on the schedule and time period defined in the VR PM job.

VNF performance is tightly coupled to the performance of the VR used by the VNF. Thus, when it is detected via monitoring the VNF performance measurements that the performance of a VNF is poor, a PM job can be created to collect the performance measurements of the VR used by the VNF. The VNF related VR performance measurements can be analyzed to determine whether to implement mitigation techniques. For example, if the VR performance measurements have some abnormal pattern (e.g. the memory usage is very high, but the CPU usage is very low), it may indicate that the VNF application is pending on the availability of VR (e.g. memory) that have been exhausted due to unknown reasons. To mitigate this problem, the VNF can be restarted, for example via VNF termination/re-instantiation or via VNF reset.

Figure 2:
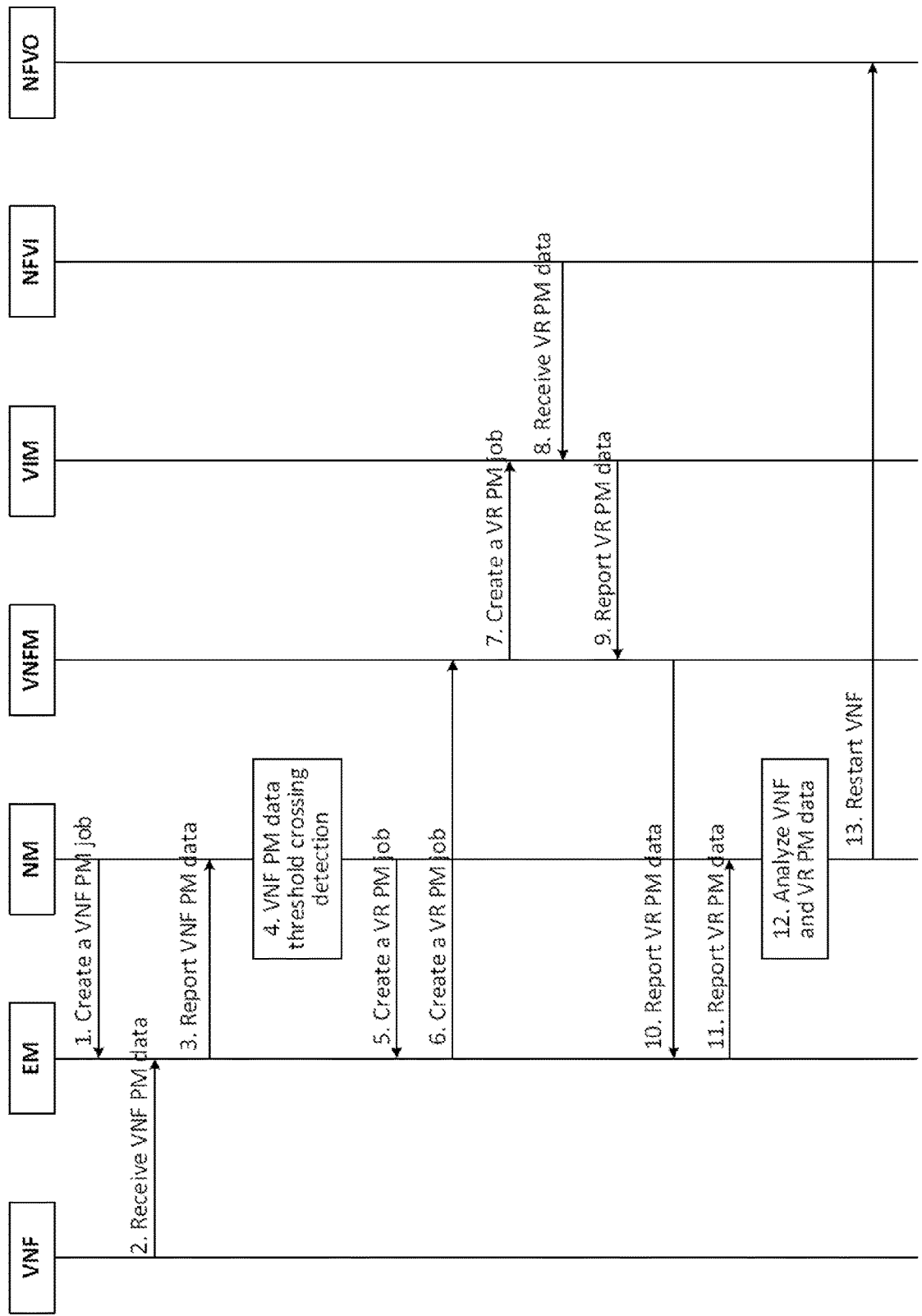
FIG. 2 is a diagram illustrating an example flow of a Virtualization Resource (VR) performance data collection scenario according to various aspects described herein.

Referring to FIG. 2, illustrated is an example flow of a VR performance data collection scenario according to various aspects described herein. At 1, the NM can create a VNF PM job at the EM to request a VNF to report the VNF PM data based on a schedule determined by the VNF PM job. At 2, the EM can receive the VNF PM data from the VNF. At 3, the EM can report the VNF PM data to the NM. At 4, the NM can detect (e.g., via a threshold crossing mechanism, etc.) that the VNF performance has been poor, and can decide to create a VR PM job to collect the VR PM data. At 5, the NM can create a VR PM job at the EM to collect the VR PM data. At 6, the EM can create a VR PM job at the VNFM, based on the VR PM job information (e.g., resource type, collection/reporting periods, etc.) received from the NM. At 7, the VNFM can create a VR PM job at the VIM, based on the VR PM job information received from the EM to collect VR PM data. At 8, the VIM can receive the VR PM data from the NFVI that generated the VR PM data at the schedule determined by the VR PM job. At 9, the VIM can forward the VR PM data to the VNFM managing the VNF/VNFC (VNF component(s)). At 10, when the VNFM receives the VR PM data, it can identify the VNF/VNFC where the VR is used, and can forward the data to the EM managing the VNF/VNFC. At 11, the EM can report the VR PM data to the NM. At 12, the NM can analyse the VNF PM data and the VNF related VR PM data, and can determine whether to restart the VNF. At 13, the NM can send a request to the NFVO to terminate and re-instantiate the VNF, or to reset the VNF.

Figure 3:
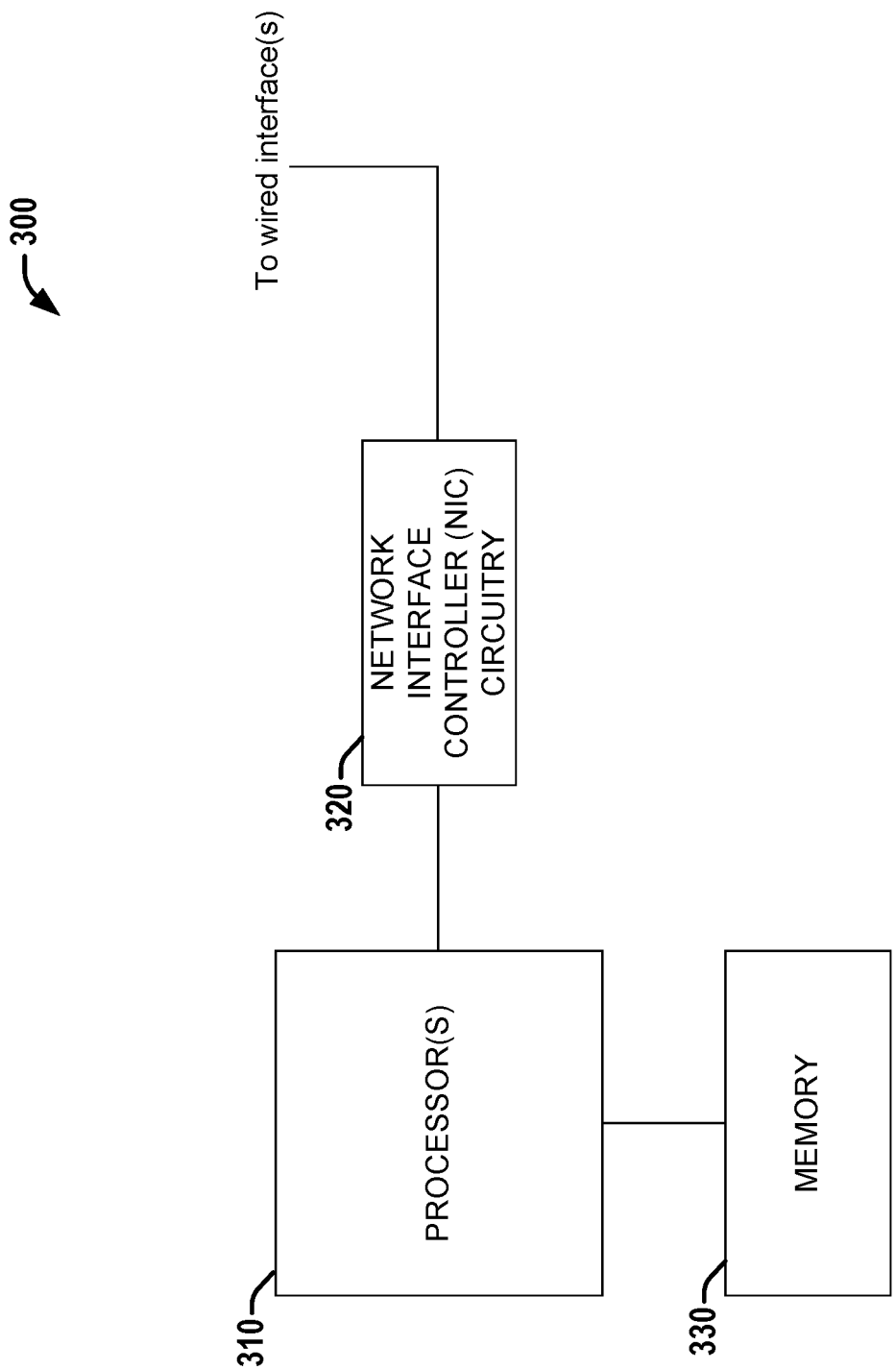
FIG. 3 is a block diagram illustrating a system that facilitates identification and mitigation of performance issues at a Virtualized Network Function (VNF) by a Network Manager (NM) according to various aspects described herein.

Referring to FIG. 3, illustrated is a block diagram of a system 300 that facilitates identification and mitigation of performance issues at a VNF by a Network Manager (NM) according to various aspects described herein. System 300 can include one or more processors 310, optional network interface controller (NIC) circuitry 320 (which can facilitate communication of data via one or more networks in some aspects), and a memory 330 (which can comprise any of a variety of storage mediums and can store instructions and/or data associated with at least one of the one or more processors 310 or NIC circuitry 320). In various aspects, system 300 can be included within a NM of a communications network. In various aspects, system 400 can be included within an EM of a communications network. In some aspects, the one or more processors 310, the NIC circuitry 320, and the memory 330 can be included in a single device, while in other aspects, they can be included in different devices, such as part of a distributed architecture. As described in greater detail below, system 300 can facilitate creation of a VNF PM job and an associated VR PM job to diagnose performance issues associated with a VNF, and can request restarting of the VNF where appropriate.

Processor(s) 310 can determine characteristics for a VNF PM job to be created at a network Element Manager (EM) (e.g., an EM employing system 400, etc.) to collect PM data from a VNF. The VNF PM job can comprise a VNF PM job schedule, which can indicate what type of data to collect from the VNF, when VNF data is collected by the EM (e.g., every 5 seconds, etc.), and when the EM reports VNF data to the NM (e.g., every 60 seconds, etc.), etc. In aspects, some or all of this information can be omitted, and default values can be employed. Processor(s) 310 can generate the VNF PM job and output a request to the EM to create the VNF PM job and collect VNF PM data according to the created VNF PM job (e.g., based at least in part on the VNF PM job schedule, etc.).

Processor(s) 310 can process VNF PM data associated with the VNF that is received from the EM, which can be collected and reported to the NM based at least in part on the VNF PM job created at the EM (e.g., according to the VNF PM job schedule, etc.). The processed VNF PM data can be analyzed by processor(s) 310 to determine whether the VNF has one or more performance issues. The analysis can be based on any of a variety of metrics or by comparison to one or more threshold values, and can, in various aspects, depend on the nature of the network function(s) associated with the VNF.

In the event no negative performance issues are detected, processor(s) 310 can continue monitoring and analyzing VNF PM data received from the EM until processor(s) 310 determine that the VNF has a negative performance issue. In response to processor(s) 310 determining that the VNF has a negative performance issue, processor(s) 310 can output a request to the EM to generate a VR PM job to collect data from the VR utilized by the VNF. The request can indicate resources (e.g., VR(s)) from which data is to be collected according to the VR PM job, along with the type(s) of data and/or measurements, when that data is to be collected and when that data is to be reported (e.g., which can both be determined via a VR PM schedule of the VR PM job), etc. In aspects, some or all of this information can be omitted, and default information employed instead. In other embodiment, the NM may decide to request EM to create a PM job to collect the VR PM data, prior to detecting negative issues from the VNF PM data. The NM then analyzes and/or correlates both VNF PM data and VR PM data to determine whether there are issues, and the actions to mitigate such issues.

Processor(s) 310 can receive VR PM data from the EM, which can be based at least in part on the request to the EM to generate the VR PM (e.g., of the indicated or default measurement type(s), from the VR resources indicated, according to the VR PM job schedule or a default schedule, etc.). Based on the VNF PM data and the VR PM data, processor(s) 310 can determine whether to restart the VNF. This determination can be based on processor(s) 310 analyzing and/or correlating the VNF PM data and the VR PM data, and determining whether an abnormal VR usage pattern is present, for example, one of the scenarios described herein (e.g., low processor usage (e.g., below a processing threshold, etc.)) coupled with high memory usage (e.g., above a memory threshold, etc.)). If processor(s) 310 detect an abnormal VR usage pattern, processor(s) 310 can determine to restart the VNF. If processor(s) 310 do not detect an abnormal VR usage pattern, alternate determinations can be made (e.g., to auto-scale the VR employed by the VNF if both processor and memory usage are above threshold values associated with such a determination; to continue monitoring VNF PM data and/or VR PM data if a determination is made that the VNF does not need to be restarted or assigned additional resources, etc.).

Based on a determination to restart the VNF, processor(s) 310 can generate and output a request to the NFVO to restart the VNF (e.g., via reset, or termination/re-instantiation, etc.). In some aspects, processor(s) 310 can determine to reset the VNF, and the request to restart the VNF can be a request to reset the VNF. In other aspects, processor(s) 310 can determine to terminate and re-instantiate the VNF, and the request to restart the VNF can be a request to terminate and re-instantiate the VNF.

In some aspects, processor(s) 310 can communicate data (e.g., as input or output) with other entities (e.g., the EM, the NFVO, etc.) via a NIC associated with NIC controller 320 (which can be associated with one or more NICs), for example, when those entities are remote and communication occurs via one or more networks. In the same or other aspects, processor(s) 310 can communicate data with these entities in distinct ways, such as via mutual access to a shared memory 330 or a portion thereof, etc.

Figure 4:
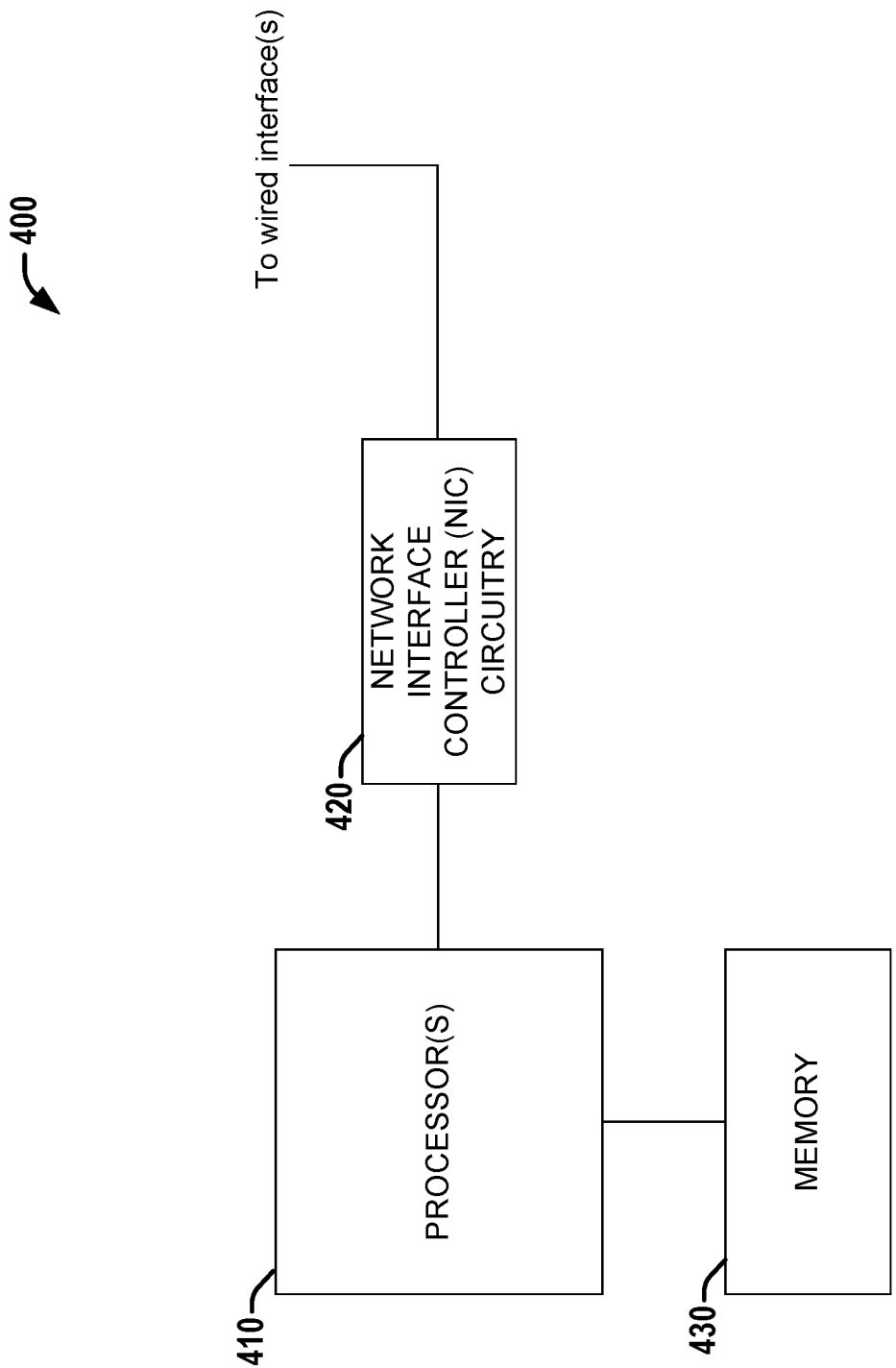
FIG. 4 is a block diagram illustrating a system that facilitates creation of Performance Measurement (PM) jobs for a VNF and an associated VR and reporting of associated PM data according to various aspects described herein.

Referring to FIG. 4, illustrated is a block diagram of a system 400 that facilitates creation of Performance Measurement (PM) jobs for a VNF and an associated VR and reporting of associated PM data according to various aspects described herein. System 400 can include one or more processors 410, optional NIC circuitry 420 (which can facilitate communication of data via one or more networks in some aspects), and memory 430 (which can comprise any of a variety of storage mediums and can store instructions and/or data associated with at least one of the one or more processors 410 or NIC circuitry 420). In various aspects, system 400 can be included within an EM of a communications network. In some aspects, the one or more processors 410, the NIC circuitry 420, and the memory 430 can be included in a single device, while in other aspects, they can be included in different devices, such as part of a distributed architecture. As described in greater detail below, system 400 can facilitate collection of PM data from one or more VNFs and the VR(s) employed by those VNF(s) to report to a NM.

Processor(s) 410 can receive a VNF PM job from a NM (e.g., a NM employing system 300, etc.). The VNF PM job can indicate a VNF to collect data from, the type(s) of data to collect, and can also comprise a VNF PM job schedule, that can indicate when to collect data from the VNF, and when to report collected data (or, in various aspects, data derived therefrom, such as averages, minima, maxima, etc.). In aspects, some or all of this information can be omitted, in which case default values can be employed. In one example embodiment, a VNF PM job schedule can indicate that the EM should collect VNF PM data from the VNF every 5 seconds (although greater or lesser times can be used in various aspects, e.g., N ms or N s, where N is a positive integer), and report VNF PM data to the NM every 60 seconds (although greater or lesser times can be used in various aspects, e.g., N ms or N s, where N is a positive integer).

Processor(s) 410 can output one or more requests to the indicated VNF to collect VNF PM data based on the VNF PM job (e.g., of the indicated or default type(s), according to the VNF PM job schedule, etc.), and can receive the requested VNF PM data from the VNF. Processor(s) 410 can output to the NM the received VNF PM data, VNF PM data derived from the received VNF PM data (and potentially from one or more other sets of received VNF PM data), or a combination thereof, at one or more reporting periods according to the VNF PM job schedule.

Processor(s) 410 can receive a request to create a VR PM job (e.g., a first VR PM job) from the NM, and can create and process a VR PM job (e.g., the first VR PM job) based on the request, which can indicate a VR employed by the VNF, one or more measurement types, and a VR PM schedule that indicates when VR PM data is to be collected by the EM and when it is to be reported to the NM (or default values can be employed (e.g., measurement type(s), collection period(s), reporting period(s), etc.)). Based on the first VR PM job, processor(s) 410 can output a second VR PM job, to the VNFM that allocated the VR to the VNF (which can create the second VR PM job at the VIM, to collect VR PM data from the allocated VR). Processor(s) 410 can receive the VR PM data from the VNFM (which receives it from the allocated VR via the VIM, which can be of the indicated or default measurement type(s) and according to the VR PM job schedule of the second VR PM job (which can indicate when VR PM data is reported to the EM, and can be the same or a different schedule than that of the first VR PM job, e.g., such that the EM receives VR PM data more frequently than it reports VR PM data, etc.). Processor(s) 410 can output to the NM the VR PM data (and/or data derived therefrom, etc.), which can be output to the NM based on the VR PM job schedule of the first VR PM job.

In some aspects, processor(s) 410 can communicate data (e.g., as input or output) with other entities (e.g., the NM, the VNF, the VNFM, etc.) via a NIC associated with NIC controller 420 (which can be associated with one or more NICs), for example, when those entities are remote and communication occurs via one or more networks. In the same or other aspects, processor(s) 410 can communicate data with these entities in distinct ways, such as via mutual access to a shared memory 430 or a portion thereof, etc.

Figure 5:
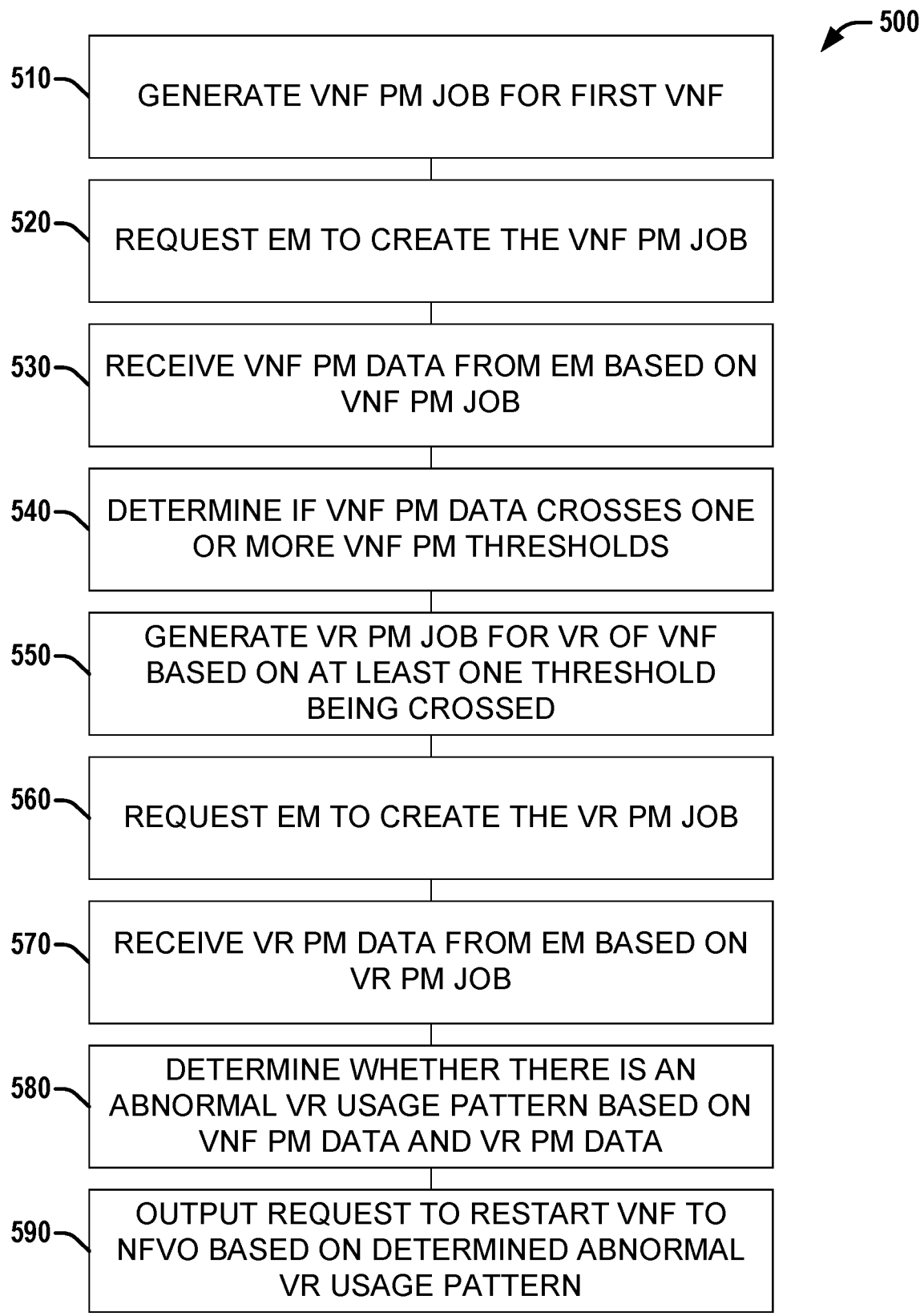
FIG. 5 is a flow diagram illustrating a method that facilitates diagnosis and mitigation of VNF performance issues by a NM according to various aspects described herein.

Referring to FIG. 5, illustrated is a flow diagram of a method 500 that facilitates diagnosis and mitigation of VNF performance issues by a NM according to various aspects described herein. In some aspects, method 500 can be performed at a NM. In other aspects, a machine readable medium can store instructions associated with method 500 that, when executed, can cause a NM to perform the acts of method 500.

At 510, a VNF PM job can be generated that can indicate a VNF that VNF PM data is to be collected from, measurement type(s), and can comprise a VNF PM job schedule that indicates collection and reporting periods for the VNF PM data.

At 520, a request can be output to an EM to create the VNF PM job and collect VNF PM data according to the VNF PM job.

At 530, VNF PM data can be received from the EM according to the VNF PM job schedule.

At 540, a determination can be made as to whether there is a negative performance issue associated with the VNF based on comparison of the VNF PM data with one or more VNF PM thresholds.

At 550, in response to at least one of the VNF PM thresholds being crossed, a VR PM job can be created that can indicate what resource(s) (e.g., which VR) data is to be collected from, what measurement type(s) are to be collected, when VR PM data is to be collected, and when VR PM data is to be reported (or default values can apply if not explicitly indicated).

At 560, a request can be output to the EM to create the VR PM job (and the EM can request the VNFM that allocated the VR to the VNF to create the VR PM job or a second VR PM job based on the VR PM job, to obtain VR PM data from the VR via the VIM).

At 570, VR PM data can be received from the EM based on the VR PM job schedule.

At 580, a determination can be made as to whether there is an abnormal VR usage pattern (e.g., high memory usage (e.g., above a memory threshold) coupled with low processor usage (e.g., below a processor threshold), etc.) associated with the VNF, which can be based on correlation and/or analysis of the VNF PM data and the VR PM data.

At 590, based on a determination that there is an abnormal VR usage pattern associated with the VNF, a request can be output to the NFVO to restart the VNF (e.g., reset the VNF, or terminate and re-instantiate the VNF).

Figure 6:
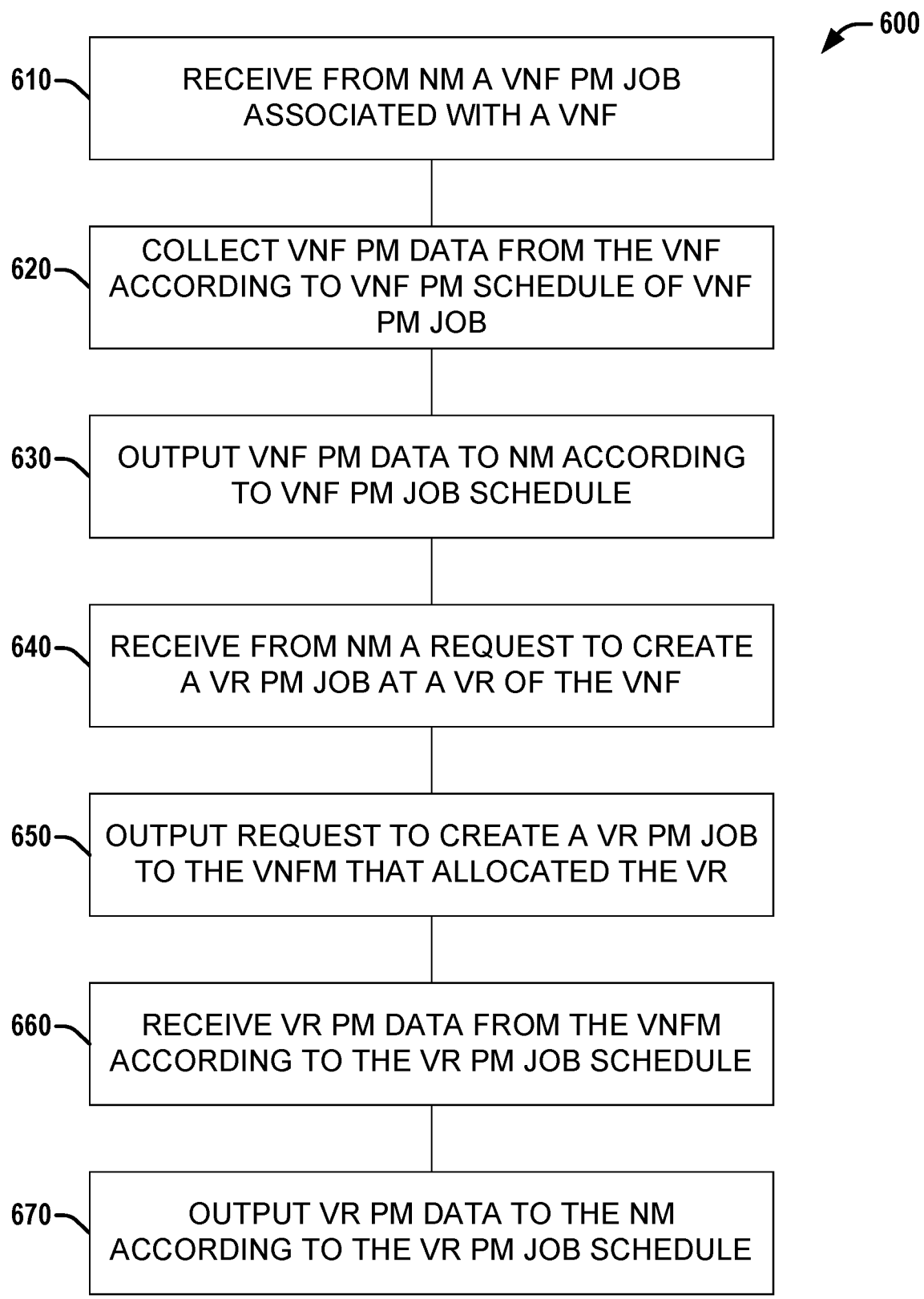
FIG. 6 is a flow diagram illustrating a method that facilitates collection and communication of PM data from a VNF and associated VR by a network Element Manager (EM) according to various aspects described herein.

Referring to FIG. 6, illustrated is a flow diagram of a method 600 that facilitates collection and communication of PM data from a VNF and associated VR by an EM according to various aspects described herein. In some aspects, method 600 can be performed at an EM. In other aspects, a machine readable medium can store instructions associated with method 600 that, when executed, can cause an EM to perform the acts of method 600.

At 610, a VNF PM job can be received from an NM. The VNF PM job can indicate one or more of a VNF to collect data from, measurement type(s) of the VNF PM data, collection period(s) for collecting VNF PM data from the VNF, or reporting period(s) for reporting VNF PM data to the NM (reporting and collection period(s) can be indicated via a VNF PM job schedule of the VNF PM job).

At 620, VNF PM data can be collected from the VNF based on the VNF PM job (e.g., based on collection period(s) indicated via the VNF PM job schedule of the VNF PM job, etc.).

At 630, VNF PM data can be output to the NM based on the VNF PM job (e.g., based on reporting period(s) indicated via the VNF PM job schedule of the VNF PM job, etc.). The output VNF PM data can comprise collected VNF PM data from one or more collection periods, data derived from collected VNF PM data, or a combination thereof.

At 640, a request can be received from the NM to create a VR PM job. The request can indicate one or more of a VR to collect the data from (e.g., the VR utilized by the VNF), measurement type(s) of data to be collected, collection period(s) to receive VR PM data from the VNFM that allocated the VR, or reporting period(s) to report data to the NM (reporting and collection period(s) can be indicated via a VR PM job schedule of the VR PM job).

At 650, a request to create a VR PM job can be output to the VNFM that allocated the VR. The output request can indicate information indicated via the received request, or can be associated with distinct information (e.g., different collection and reporting period(s), etc.).

At 660, VR PM data can be received from the VNFM (which received the VR PM data from the VR via the VIM) based on the VR PM job schedule.

At 670, the VR PM data can be output to the NM based on the VR PM job (e.g., based on reporting period(s) indicated via the VR PM job schedule of the VR PM job, etc.). The output VR PM data can comprise collected VR PM data from one or more collection periods, data derived from collected VR PM data, or a combination thereof.

The tables below indicate example use cases of VNF PM data and VR PM data in connection with various aspects described herein. Table 1, below, shows an example use case of VNF related VR performance measurements:

TABLE 1

Use Case of VNF related VR performance measurements

| Use case stage | Evolution/Specification | <<Use>> Related use |
|---|---|---|
| Goal | The goal is for NM to collect the VNF related VR performance measurements that can be analysed to understand the cause of poor VNF performance. For example, if the CPU usage is low, but, the memory usage is very high (e.g. 90%), it may indicate that the VNF application is pending on the availability of certain resources (e.g. memory). | |
| Actors and Roles | NM receives the performance measurements. EM reports the performance measurements. VNFM reports the VR PM data. VIM reports the VR performance measurements. NFVI produces the VR PM data. | |
| Telecom resources | NM, EM, VNFM, VIM, NFVI | |
| Assumptions | The VNF instance is in operation, and is using the VR allocated to the VNF instance. | |
| Pre-conditions | Appropriate PM jobs have been scheduled to report the VNF related VR PM data. | |
| Begins when | NFVI generates a VR PM data. | |
| Act 1 (M) | VIM collects the VR PM data from NFVI, and reports the data to the correct VNFM managing the subject VNF/VNFC that utilizes the VRs. | |
| Act 2 (M) | VNFM identifies VNF/VNFC that utilizes the VR where the PM data is generated, and forwards the VR PM data to EM managing the subject VNF/VNFC. | |
| Act 3 (M) | EM forwards the VNF related VR PM data to NM. | |
| Ends when (*) | NM receives the VNF related VR PM data. | |
| Exceptions | | |
| Post-conditions | NM may restart the VNF via VNF termination/instantiation, or reset. | |
| Traceability (*) | | |

Table 2, below, shows an example use case of mitigating a VNF performance bottleneck:

TABLE 2

Use Case of mitigating VNF performance bottleneck

| Use case stage | Evolution/Specification | <<Use>> Related use |
|---|---|---|
| Goal | To mitigate the VNF performance bottleneck. | |
| Actors and Roles | 3GPP management system. | |
| Telecom resources | NFV-MANO [NFV Management and Orchestration] VNF | |
| Assumptions | 3GPP management system is set up to collect VNF performance measurements and NFV-MANO is set up to collect VNF-related virtualized resource performance measurements. | |
| Pre-conditions | VNF application threshold crossing trigger and VNF-related virtualized resource threshold crossing trigger have been set up by corresponding system(s) (i.e., 3GPP management system or NFV-MANO system). | |
| Begins when | The VNF performance measurement report(s), VNF-related virtualized resource performance measurement report(s) or the thresholds crossing alarm(s) are generated. | |

TABLE 2-continued

Use Case of mitigating VNF performance bottleneck

| Use case stage | Evolution/Specification | <<Use>> Related use |
|---|---|---|
| Act 1 (M) | 3GPP management system receives the VNF performance measurement report(s), VNF-related virtualized resource performance measurement report(s) or the thresholds crossing alarm(s). | |
| Act 2 (M) | 3GPP management system decides to optimize the VNF performance and mitigate the VNF performance bottleneck. | |
| Act 3 (M) | 3GPP management system requests VNF LCM [Lifecycle Management] operation (e.g. expansion) towards NFV-MANO. | |
| Ends when (*) | NFV-MANO executes the VNF LCM operation. | |
| Exceptions | One of the acts identified above fails. | |
| Post-conditions | The VNF performance bottleneck has been mitigated after the VNF LCM operation. | |
| Traceability (*) | REQ-NFV_PM_SYS-CON-3 | |

In various aspects, embodiments described herein can be employed in connection with a communications network that comprises one or more radio access networks (RANs) that facilitate wireless communications with or between one or more user equipments (UEs). The following is a description of an example UE that can be employed in connection with such a RAN.

Embodiments described herein may be implemented into a system using any suitably configured hardware and/or software. FIG. 7 illustrates, for one embodiment, example components of a User Equipment (UE) device 700. In some embodiments, the UE device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications circuitry 702 depending on the desired output frequency. In some embodiments, a divider control input (e.g., N) may be determined from a look-up table based on a channel indicated by the applications circuitry 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the UE device 700 may include additional elements such as, for example, memory/storage, display, camera, sensor, and/or input/output (I/O) interface.

Additionally, although the above example discussion of device 700 is in the context of a UE device, in various aspects, a similar device can be employed in connection with a base station (BS) such as an Evolved NodeB (eNB).

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a Network Manager (NM), comprising one or more processors configured to: output a request to a network Element Manager (EM) to create a Virtualized Network Function (VNF) PM job to collect VNF Performance Measurement (PM) data; process a set of Virtualized Network Function (VNF) PM data associated with a VNF, wherein the set of VNF PM data is received from the EM; output a request to the EM to create a Virtualization Resource (VR) PM job to collect VR PM data from a VR used by the VNF; process a set of VR PM data received from the EM; make a determination whether to restart the VNF, based on the processed set of VR PM data and the processed set of VNF PM data; and output a request to a network function virtualization orchestrator (NFVO) to restart the VNF based on a determination to restart the VR.

Example 2 comprises the subject matter of any variation of example 1, wherein the one or more processors are further configured to make a determination whether the VNF has a negative performance issue, based on the processed set of VNF PM data, wherein the request to the EM to create the VR PM job is based on a determination that the VNF has the negative performance issue.

Example 3 comprises the subject matter of any variation of example 1, wherein the one or more processors are configured to make the determination whether the VNF has the negative performance issue based on one or more comparisons between the set of VNF PM data and one or more VNF PM thresholds.

Example 4 comprises the subject matter of any variation of any of examples 1-3, wherein the one or more processors are further configured to: analyze the set of VNF PM data and the set of VR PM data; make a determination whether an abnormal VR usage pattern is detected based on the analyzed set of VNF PM data and the analyzed set of VR PM data; and make the determination whether to restart the VNF based on the determination being made that the abnormal VR usage pattern is detected.

Example 5 comprises the subject matter of any variation of any of examples 1-3, wherein the abnormal VR usage pattern comprises a processor usage below a processing threshold and a memory usage above a memory threshold.

Example 6 comprises the subject matter of any variation of any of examples 1-3, wherein the one or more processors are further configured to: generate a VNF PM job associated with the VNF, wherein the VNF PM job comprises a VNF PM job schedule; and output a request to the EM to create the VNF PM job, wherein the set of VNF PM data is received from the EM based on the VNF PM job schedule.

Example 7 comprises the subject matter of any variation of any of examples 1-3, wherein the VR PM job designates a resource type that indicates the VR from which the VR PM data is to be collected.

Example 8 comprises the subject matter of any variation of any of examples 1-3, wherein the VR PM job designates a collection period that indicates when the VR PM data is to be collected.

Example 9 comprises the subject matter of any variation of any of examples 1-3, wherein the VR PM job designates one or more reporting periods that indicate when the VR PM data is to be reported to the NM.

Example 10 comprises the subject matter of any variation of any of examples 1-3, wherein the VR PM job indicates one or more measurement types to be collected, wherein the set of VR PM data comprises data of the one or more indicated measurement types.

Example 11 comprises the subject matter of any variation of any of examples 1-3, wherein the determination to restart the VNF is a determination to terminate and re-instantiate the VNF, and wherein the request to restart the VNF is a request to terminate and re-instantiate the VNF.

Example 12 comprises the subject matter of any variation of any of examples 1-3, wherein the determination to restart the VNF is a determination to reset the VNF, and wherein the request to restart the VNF is a request to reset the VNF.

Example 13 comprises the subject matter of any variation of any of examples 1-2, wherein the one or more processors are configured to make the determination whether the VNF has the negative performance issue based on one or more comparisons between the set of VNF PM data and one or more VNF PM thresholds.

Example 14 comprises the subject matter of any variation of any of examples 1-2 or 13, wherein the one or more processors are further configured to: analyze the set of VNF PM data and the set of VR PM data; make a determination whether an abnormal VR usage pattern is detected based on the analyzed set of VNF PM data and the analyzed set of VR PM data; and make the determination whether to restart the VNF based on the determination being made that the abnormal VR usage pattern is detected.

Example 15 comprises the subject matter of any variation of any of examples 1-2 or 13-14, wherein the abnormal VR usage pattern comprises a processor usage below a processing threshold and a memory usage above a memory threshold.

Example 16 comprises the subject matter of any variation of any of examples 1-2 or 13-15, wherein the one or more processors are further configured to: generate a VNF PM job associated with the VNF, wherein the VNF PM job comprises a VNF PM job schedule; and output a request to the EM to create the VNF PM job, wherein the set of VNF PM data is received from the EM based on the VNF PM job schedule.

Example 17 comprises the subject matter of any variation of any of examples 1-2 or 13-16, wherein the VR PM job designates one or more of a resource type that indicates the VR from which the VR PM data is to be collected, a collection period that indicates when the VR PM data is to be collected, one or more reporting periods that indicate when the VR PM data is to be reported to the NM, or one or more measurement types to be collected and wherein the set of VR PM data comprises data of the one or more indicated measurement types.

Example 18 comprises the subject matter of any variation of any of examples 1-2 or 13-17, wherein the determination to restart the VNF is a determination to terminate and re-instantiate the VNF, and wherein the request to restart the VNF is a request to terminate and re-instantiate the VNF.

Example 19 comprises the subject matter of any variation of any of examples 1-2 or 13-17, wherein the determination to restart the VNF is a determination to reset the VNF, and wherein the request to restart the VNF is a request to reset the VNF.

Example 20 comprises the subject matter of any variation of example 1, wherein the one or more processors are further configured to: analyze the set of VNF PM data and the set of VR PM data; make a determination whether an abnormal VR usage pattern is detected based on the analyzed set of VNF PM data and the analyzed set of VR PM data; and make the determination whether to restart the VNF based on the determination being made that the abnormal VR usage pattern is detected.

Example 21 comprises the subject matter of any variation of example 1, wherein the abnormal VR usage pattern comprises a processor usage below a processing threshold and a memory usage above a memory threshold.

Example 22 comprises the subject matter of any variation of example 1, wherein the one or more processors are further configured to: generate a VNF PM job associated with the VNF, wherein the VNF PM job comprises a VNF PM job schedule; and output a request to the EM to create the VNF PM job, wherein the set of VNF PM data is received from the EM based on the VNF PM job schedule.

Example 23 comprises the subject matter of any variation of example 1, wherein the VR PM job designates a resource type that indicates the VR from which the VR PM data is to be collected.

Example 24 comprises the subject matter of any variation of example 1, wherein the VR PM job designates a collection period that indicates when the VR PM data is to be collected.

Example 25 comprises the subject matter of any variation of example 1, wherein the VR PM job designates one or more reporting periods that indicate when the VR PM data is to be reported to the NM.

Example 26 comprises the subject matter of any variation of example 1, wherein the VR PM job indicates one or more measurement types to be collected, wherein the set of VR PM data comprises data of the one or more indicated measurement types.

Example 27 comprises the subject matter of any variation of example 1, wherein the determination to restart the VNF is a determination to terminate and re-instantiate the VNF, and wherein the request to restart the VNF is a request to terminate and re-instantiate the VNF.

Example 28 comprises the subject matter of any variation of example 1, wherein the determination to restart the VNF is a determination to reset the VNF, and wherein the request to restart the VNF is a request to reset the VNF.

Example 29 is a machine readable medium comprising instructions that, when executed, cause a Network Manager (NM) to: generate a Virtualized Network Function (VNF) Performance Management (PM) job associated with a first VNF, wherein the VNF PM job comprises a VNF PM schedule; output a request to an Element Manager (EM) to create the VNF PM job; receive a set of VNF PM data from the EM according to the VNF PM schedule; generate a Virtualization Resource (VR) PM job comprising a VR PM schedule, wherein the VR PM job is associated with a VR of the VNF; output a request to the EM to create the VRM PM job; receive a set of VR PM data from the EM according to the VR PM schedule; make a determination whether an abnormal VR usage pattern is present based on an analysis of the set of VNF PM data and the set of VR PM data; and output to a Network Function Virtualization Orchestrator (NFVO) a request to restart the VNF based on a determination that the abnormal VR usage pattern is present.

Example 30 comprises the subject matter of any variation of example 29, wherein the instructions, when executed, further cause the NM to compare the set of VNF PM data to one or more VNF PM thresholds to determine whether the one or more VNF PM thresholds have been crossed, wherein the VR PM job is generated based on a determination that at least one of the one or more VNF PM thresholds has been crossed.

Example 31 comprises the subject matter of any variation of example 29, wherein the VR PM job indicates a resource type of the VR, a collection period of the VR PM schedule, and one or more reporting periods of the VR PM schedule, wherein the set of VR PM data is received from the EM in accordance with the one or more reporting periods.

Example 32 comprises the subject matter of any variation of any of examples 29-31, wherein the request to restart the VNF comprises a request to terminate and re-instantiate the VNF.

Example 33 comprises the subject matter of any variation of any of examples 29-31, wherein the request to restart the VNF comprises a request to reset the VNF.

Example 34 comprises the subject matter of any variation of example 29, wherein the request to restart the VNF comprises a request to terminate and re-instantiate the VNF.

Example 35 comprises the subject matter of any variation of example 29, wherein the request to restart the VNF comprises a request to reset the VNF.

Example 36 is an apparatus configured to be employed within a network Element Manager (EM), comprising one or more processors configured to: process a Virtualized Network Function (VNF) Performance Measurement (PM) job associated with a VNF, wherein the VNF PM job is received from a Network Manager (NM); output a request to the VNF to collect a first set of VNF PM data based on the VNF PM job; receive the first set of VNF PM data from the VNF in response to the request to the VNF; output to the NM a second set of VNF PM data based on the first set of VNF PM data; process a first Virtualization Resource (VR) PM job associated with a VR of the VNF, wherein the VR PM job is received from the NM and based on the set of VNF PM data; generate a second VR PM job based on the first VR PM job; output the second VR PM to a VNF Manager (VNFM) that allocated the VR to the VNF; receive a first set of VR PM data from the VNFM; and output to the NM a second set of VR PM data based on the first set of VR PM data.

Example 37 comprises the subject matter of any variation of example 36, wherein the first VR PM job and the second VR PM job each indicate one or more measurement types to be collected, wherein each of the first and the second set of VR PM data comprises data of the one or more indicated measurement types.

Example 38 comprises the subject matter of any variation of any of examples 36-37, wherein the first VR PM job comprises a first VR PM schedule and the second VR PM job comprises a second VR PM schedule.

Example 39 comprises the subject matter of any variation of example 38, wherein the first VR PM schedule and the second VR PM schedule each define a collection period that indicates when the VR PM data is to be collected.

Example 40 comprises the subject matter of any variation of example 38, wherein the second VR PM schedule defines a second reporting period that indicates when the first set of VR PM data is to be reported from the VNFM, wherein the one or more processors are configured to receive the first set of VR PM data from the VNFM according to the second VR PM schedule.

Example 41 comprises the subject matter of any variation of example 38, wherein the first VR PM schedule defines a first reporting period that indicates when the second set of VR PM data is to be output by the EM, wherein the one or more processors are configured to output the second set of VR PM data to the NM according to the first VR PM schedule.

Example 42 comprises the subject matter of any variation of any of examples 36-37, wherein the first set of VNF PM data is one of a plurality of sets of VNF PM data received from the VNF, wherein the second set of VNF PM data is based at least in part on each of the plurality of sets of VNF PM data.

Example 43 comprises the subject matter of any variation of any of examples 36-37, wherein the VNF PM job comprises a VNF PM schedule.

Example 44 comprises the subject matter of any variation of example 43, wherein the request to the VNF indicates to collect the first set of VNF data according to the VNF PM schedule.

Example 45 comprises the subject matter of any variation of example 43, wherein the second set of VNF data is output to the NM according to the VNF PM schedule.

Example 46 comprises the subject matter of any variation of example 36, wherein the first VR PM job comprises a first VR PM schedule and the second VR PM job comprises a second VR PM schedule.

Example 47 comprises the subject matter of any variation of example 36, wherein the first set of VNF PM data is one of a plurality of sets of VNF PM data received from the VNF, wherein the second set of VNF PM data is based at least in part on each of the plurality of sets of VNF PM data.

Example 48 comprises the subject matter of any variation of example 36, wherein the VNF PM job comprises a VNF PM schedule.

Example 49 is an apparatus configured to be employed within a Network Manager (NM), comprising one or more processors configured to: output a request to a network Element Manager (EM) to create a Virtualized Network Function (VNF) PM job to collect VNF Performance Measurement (PM) data; process a set of Virtualized Network Function (VNF) Performance Measurement (PM) data associated with a VNF, wherein the set of VNF PM data is received from the EM; make a determination whether the VNF has a negative performance issue, based on the processed set of VNF PM data; output a request to the EM to create a Virtualization Resource (VR) PM job to collect VR PM data from a VR used by the VNF, based on a determination that the VNF has the negative performance issue; process a set of VR PM data received from the EM; make a determination whether to restart the VNF, based on the processed set of VR PM data and the processed set of VNF PM data; and output a request to a network function virtualization orchestrator (NFVO) to restart the VNF based on a determination to restart the VR.

Example 50 comprises the subject matter of any variation of example 49, wherein the one or more processors are configured to make the determination whether the VNF has the negative performance issue based on one or more comparisons between the set of VNF PM data and one or more VNF PM thresholds.

Example 51 comprises the subject matter of any variation of any of examples 49-50, wherein the one or more processors are further configured to: analyze the set of VNF PM data and the set of VR PM data; make a determination whether an abnormal VR usage pattern is detected based on the analyzed set of VNF PM data and the analyzed set of VR PM data; and make the determination whether to restart the VNF based on the determination being made that the abnormal VR usage pattern is detected.

Example 51 comprises the subject matter of any variation of example 49, wherein the one or more processors are further configured to: analyze the set of VNF PM data and the set of VR PM data; make a determination whether an abnormal VR usage pattern is detected based on the analyzed set of VNF PM data and the analyzed set of VR PM data; and make the determination whether to restart the VNF based on the determination being made that the abnormal VR usage pattern is detected.

Example 52 is an apparatus configured to be employed within a Network Manager (NM), comprising means for processing configured to: generate a Virtualized Network Function (VNF) Performance Management (PM) job associated with a first VNF, wherein the VNF PM job comprises a VNF PM schedule; output a request to an Element Manager (EM) to create the VNF PM job; receive a set of VNF PM data from the EM according to the VNF PM schedule; generate a Virtualization Resource (VR) PM job comprising a VR PM schedule, wherein the VR PM job is associated with a VR of the VNF; output a request to the EM to create the VRM PM job; receive a set of VR PM data from the EM according to the VR PM schedule, make a determination whether an abnormal VR usage pattern is present based on an analysis of the set of VNF PM data and the set of VR PM data; and output to a Network Function Virtualization Orchestrator (NFVO) a request to restart the VNF based on a determination that the abnormal VR usage pattern is present.

Example 53 comprises the subject matter of any variation of example 52, wherein the means for processing are further configured to compare the set of VNF PM data to one or more VNF PM thresholds to determine whether the one or more VNF PM thresholds have been crossed, wherein the VR PM job is generated based on a determination that at least one of the one or more VNF PM thresholds has been crossed.

Example 54 comprises the subject matter of any variation of example 52, wherein the VR PM job indicates a resource type of the VR, a collection period of the VR PM schedule, and one or more reporting periods of the VR PM schedule, wherein the set of VR PM data is received from the EM in accordance with the one or more reporting periods.

Example 55 comprises the subject matter of any variation of any of examples 52-54, wherein the request to restart the VNF comprises a request to terminate and re-instantiate the VNF.

Example 56 comprises the subject matter of any variation of any of examples 52-54, wherein the request to restart the VNF comprises a request to reset the VNF.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A method, for restoring performance of virtual network functions (VNFs) of a wireless network, comprising:
    outputting a request to a network Element Manager (EM) to create a Virtualized Network Function (VNF) Performance Measurement (PM) job to collect VNF PM data from a VNF;
    receiving a set of the VNF PM data associated with the VNF from the EM;
    processing the set of the VNF PM data associated with the VNF;
    outputting a request to the EM to create a Virtualization Resource (VR) PM job to collect, through a VNF Manager (VNFM) and a virtualized infrastructure manager (VIM), VR PM data from a VR used by the VNF;
    receiving a set of the VR PM data from the EM; and
    processing the set of the VR PM data.

2. The method of claim 1, further comprising:
    making a determination, based on the processed set of the VNF PM data, whether the VNF has a negative performance issue, wherein the request to the EM to create the VR PM job is based on a determination that the VNF has the negative performance issue.

3. The method of claim 2, further comprising:
    making the determination, based on one or more comparisons between the set of the VNF PM data and one or more VNF PM thresholds, whether the VNF has the negative performance issue.

4. The method of claim 1, further comprising:
    analyzing the set of the VNF PM data and the set of VR PM data;
    making a determination, based on the analyzed set of VNF PM data and the analyzed set of VR PM data, whether an abnormal VR usage pattern is detected; and
    making a determination whether to restart the VNF based on the determination being made that the abnormal VR usage pattern is detected.

5. The method of claim 4, wherein the abnormal VR usage pattern comprises a processor usage below a processing threshold and a memory usage above a memory threshold.

6. The method of claim 1, further comprising:
    generating a VNF PM job associated with the VNF, wherein the VNF PM job comprises a VNF PM time period to execute; and
    outputting a request to the EM to create the VNF PM job; wherein the set of the VNF PM data is received from the EM based on the VNF PM time period to execute.

7. The method of claim 1, wherein the VR PM job designates a resource type that indicates the VR from which the VR PM data is to be collected.

8. The method of claim 1, wherein the VR PM job designates a collection period that indicates when the VR PM data is to be collected.

9. The method of claim 1, wherein the VR PM job designates one or more reporting periods that indicate when the VR PM data is to be reported to a network manager (NM).

10. The method of claim 1, wherein the VR PM job indicates one or more measurement types to be collected, wherein the set of VR PM data comprises data of the one or more indicated measurement types.

11. The method of claim 1, wherein a determination to restart the VNF is made based on the processed set of VR PM data and the processed set of VNF PM data and is a determination to terminate and re-instantiate the VNF, and wherein a request to restart the VNF is sent to a network function virtualization orchestrator (NFVO) and is a request to terminate and re-instantiate the VNF.

12. The method of claim 1, wherein a determination to restart the VNF is made based on the processed set of VR PM data and the processed set of VNF PM data and is a determination to reset the VNF, and wherein a request to restart the VNF is sent to a network function virtualization orchestrator (NFVO) and is a request to reset the VNF.

13. An apparatus configured to be employed for a network Element Manager (EM), comprising:
    a memory for storing instructions; and
    one or more processors, when executing the instructions, configured to:
        receive, from a Network Manager (NM), a first Performance Measurement (PM) job related to a Virtualized Network Function (VNF) for collecting VNF PM data, the first PM job comprising measurement types, measured resources, and time period to execute and being associated with the VNF;
        collect the VNF PM data from the VNF;
        receive, from the NM, a second PM job related to Virtualization Resource (VR) for collecting VR PM data, the second PM job comprising measurement types, measured resources, and time period to execute and being associated with a VR of the VNF;

output a request to a VNF Manager (VNFM) to create a PM job at the VNFM according to the second PM job; and collect the VR PM data from the VNFM.

14. The apparatus of claim 13, wherein the instructions, when executed, further cause the EM to report the VNF PM data to the NM, wherein the VNF PM data is used to determine whether to create the second PM job.

15. A method, for restoring performance of virtual network functions (VNFs) of a wireless network, comprising:
    receiving, from a Network Manager (NM), a first Performance Measurement (PM) job for collecting PM data;
    processing the first PM job at a network element manager (EM); and
    if the collecting PM data is for Virtualized Network Function (VNF) PM data collection,
        outputting a request to a VNF to collect a first set of PM data based on the first PM job; and
        receiving the first set of PM data from the VNF in response to the request to the VNF; and
    if the collecting PM data is for Virtualization Resource (VR) PM data collection,
        creating a second PM job at a VNF Manager (VNFM) to collect a second set of PM data, and
        receiving the second set of PM data from the VNFM; and
        outputting to the NM the first set of PM data and the second set of the PM data.

16. The method of claim 15, wherein the first PM job and the second PM job each indicate one or more measurement types to be collected, wherein each of the first set of PM data and the second set of PM data comprises data of the one or more indicated measurement types.

17. The method of claim 15, wherein the first PM job comprises a first time period to execute and the second PM job comprises a second time period to execute, wherein the first time period to execute and the second time period to execute each define a collection period that indicates when the PM data is to be collected.

18. The method of claim 17, wherein the first set of PM data is used to determine whether to create the second PM job.

19. The method of claim 15, wherein the first set of PM data is one of a plurality of sets of VNF PM data received from the VNF.

20. The method of claim 15, wherein the first PM job comprises a VNF time period to execute.

* * * * *